US006741746B2

(12) United States Patent
Epstein et al.

(10) Patent No.: US 6,741,746 B2
(45) Date of Patent: *May 25, 2004

(54) METHOD AND APPARATUS FOR PROCESSING IMAGE FILES

(75) Inventors: Yoav Epstein, San Diego, CA (US); Kirkpatrick William Norton, San Diego, CA (US); Hoang Nhu, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/072,245

(22) Filed: Feb. 8, 2002

(65) Prior Publication Data

US 2002/0085767 A1 Jul. 4, 2002

Related U.S. Application Data

(63) Continuation of application No. 09/271,039, filed on Mar. 17, 1999, now Pat. No. 6,381,371.

(51) Int. Cl.[7] .................................................. G06K 9/36

(52) U.S. Cl. ....................................................... 382/233

(58) Field of Search ................................. 382/232–246, 382/296–300; 358/261.4, 432–451; 348/415.1–416.1, 458; 345/434–437; 375/240.24

(56) References Cited

U.S. PATENT DOCUMENTS

| | | | | |
|---|---|---|---|---|
| 5,047,868 A | * | 9/1991 | Takeda et al. | 386/109 |
| 5,327,248 A | * | 7/1994 | Miller et al. | 358/433 |
| 5,699,458 A | * | 12/1997 | Sprague | 382/250 |
| 5,867,598 A | * | 2/1999 | DeQuiroz | 382/236 |
| 6,259,810 B1 | * | 7/2001 | Gill et al. | 382/166 |

* cited by examiner

*Primary Examiner*—Jingge Wu

(57) ABSTRACT

A method and apparatus for manipulating digitized images stored as variable length encoded bitstreams such as JPEG format in a manner that reduces memory and processor resource requirements. A prescan means sequentially decompresses the bitstream to identify the location of encoded pixel image areas. Designated ones of these locations are recorded or stored in a prescan table. After the prescan operation has been performed on the image, image manipulations such as rotating, cropping, and zooming can be performed on a selected portion of the image by directly accessing only the encoded pixel image areas to be manipulated, without the need to sequentially decode and store all the encoded image areas in order to locate the ones of interest.

34 Claims, 7 Drawing Sheets

METHOD AND APPARATUS FOR PROCESSING IMAGE FILES

This is a continuation of application Ser. No. 09/271,039 filed Mar. 17, 1999 now U.S Pat. No. 6,381,371 B1.

FIELD OF THE INVENTION

The present invention relates generally to image processing. It relates more particularly to manipulation of digitized images, such as rotating, cropping, and zooming, that is performed prior to printing or displaying the image in a final form.

BACKGROUND OF THE INVENTION

Storage of pictures and images in computer-readable form is commonplace. Scanners are used to digitize printed pictures or artwork. In digital cameras, flash memory cards replace film as the medium for capturing and storing photographs. The data files created by scanners, digital cameras, and the like can be stored and transmitted; for example, by e-mail, or by incorporating them into web pages for the internet.

Software programs translate data files representing images into a form which can be displayed on devices such as a computer monitor or the LCD viewfinder within a digital camera, and subsequently printed in a hard copy form.

In order for digitized images to be widely exchanged and accessed, the image information in the data file must be stored in an agreed-to format. Many such formats have been developed. Formats for still pictures include Bitmap, GIF, TIFF, and JFIF; formats for moving pictures include MPEG and AVI.

It takes a large amount of digital memory to store a high resolution digitized photograph consisting of hundreds of thousands of individual picture elements known as pixels. Such large amounts of storage are necessary because each pixel in the digitized photograph represents the absence or presence of an image element as well as supporting information such as the color and brightness of that element of the image when present. It is very common for digitized images to be stored in a row-and-column matrix format of at least 1024 pixels in one direction (for instance, horizontal) by 768 pixels in the other direction (eg. vertical), resulting in a total of 786,432 pixels for the image. If the image is in color, multiple sets of information, called color channels, are needed to record both the brightness and the color of the pixel. One way of storing color information, known as RGB format, uses separate sets for the brightness of red, green, and blue, which when mixed together produce the correct color of the pixel. Another way, known as YCbCr (or YCC) format, stores brightness (or luminance) information in one set, and uses two sets to store color (chrominance) information.

Computer memory is structured logically as a one-dimensional block of consecutive storage locations, each of which has an address. The two-dimensional image information is stored in this one-dimensional memory in a order specified by the image format. One common order is to store the pixels in row order, from left to right beginning with the top row of the image, then the second from the top row from left to right, and repeating this sequence until the entire image has been stored.

When digitized image data is stored in RGB or YCC format, the amount of storage required to hold the information for a single pixel is the same for all pixels, typically about 8 to 12 bits of information. Because the amount of storage per pixel is fixed, and because the order in which pixels are stored is known, a computer program can easily calculate the location in memory of any individual pixel. Sometimes rectangular sets of pixels in the digitized image is grouped into an image area. Since the number of vertical and horizontal pixels per image area is fixed, the size of all image areas is the same, and thus the location in memory of any individual image area can similarly be easily calculated. When the digitized image is to be manipulated, for example by rotating, cropping, or zooming it, specific image areas need to be located in a non-sequential order. Because the location of image areas can be easily calculated, the image areas can be obtained from memory quickly and efficiently.

However, storing a digitized image in the type of format described has the disadvantage of requiring a large amount of memory. The larger the amount of memory required per image, the fewer the number of images that can be stored on a memory device of a given storage capacity, such as a disk drive or the flash memory card in a digital camera. To increase the number of files that can be stored on a given memory device, many systems encode the digitized image to compress the image data into a smaller size before storing it in memory. Compression transforms the data so as to reduce the amount of memory required to hold the digitized image. One commonly used compression technique, known as variable length encoding or entropy encoding, results in the image areas no longer being the same size. As a result, the location of individual image areas can no longer be calculated, and image areas cannot be accessed in a non-sequential fashion. In order to find a desired image area, the image must be decoded sequentially bit-by-bit from the start of the image until the desired image area is located.

Several techniques for accessing individual image areas in a digitized image stored using variable length encoding are known to those skilled in the art. One prior art method decompresses the entire image file area by area into a buffer memory, expanding the image areas back to a fixed size so that the location of areas can be easily calculated. A drawback to this method is that a buffer memory large enough to hold the entire image in uncompressed format is required. Adding a memory element or increasing the size of an existing memory element to accommodate large, uncompressed image files can significantly increase the cost of a printer, digital camera, or other type of computer peripheral that performs image manipulations on compressed files.

Another prior art method scans the file sequentially, counting and discarding areas until the desired one is encountered. This method does not require a large buffer, but instead requires a disproportionately large amount of processing time because this method is repeated, starting from the beginning of the file, for each image area to be processed. In order to complete the image manipulation in an acceptable amount of time, a more powerful processor than otherwise needed may be required, which can also significantly increase the cost of the product.

Yet another prior art method stores location information for the image areas in the data file, along with the image areas themselves, prior to compression. However, including this additional information in the image file makes the size larger, and more importantly results in a custom image file format that is no longer compatible with industry standards. This prevents a device using this method from manipulating files stored in a standard file format, and thus inhibits exchange of digitized images with others.

From the foregoing, it is apparent that there is still a need for a way to randomly access individual areas of image information stored in a variable length encoded format without requiring a large buffer memory, excessive processing time or power, or use of a non-standard image file format.

SUMMARY OF THE INVENTION

In a preferred embodiment, an image processing apparatus includes a prescanner that sequentially detects individual ones of a plurality of encoded image areas embedded within a data bitstream of digital information and a decoder that decodes at least some of the detected ones of the plurality of encoded image areas that have been temporarily stored. In accordance with the novel processing method of the present invention, the prescanner stores only locating information relative to a first encoded image area word for each of the image areas in the digital image to be processed for image manipulation purposes. The temporarily stored location information is selectively retrieved by the decoder in a non-sequential manner and then decoded for image manipulation purposes in accordance with conventional image manipulation techniques. In short, the novel method locates and decodes only those image areas of interest relative to an image manipulation process. Types of image manipulation include rotating, cropping, or zooming the image. For each color channel in the digitized image, coefficients which assist in decoding image areas when they are accessed non-sequentially may optionally be stored along with the location information. Image areas for which location information is not stored may be accessed efficiently by non-sequentially accessing a prior image area for which location information is stored, then sequentially accessing subsequent image areas until the area of interest is located.

In another preferred embodiment of the present invention, an image processing system includes an image processing apparatus that is coupled between a data bitstream source and an output viewing arrangement. The image processing apparatus sequentially scans the bitstream provided by the data bitstream source in order to locate data indicative of compressed image areas within a digitized image displayable on the output viewing arrangement. The image processing apparatus temporarily stores location information identifying the location of each image area within the data bitstream and subsequently retrieves selected ones of the stored location information to fully decode the image data associated with the retrieved information for displaying or printing a manipulated image via the output viewing arrangement. The image processing apparatus includes an image restructuring device which manipulates the decoded image areas, under the control of an image processing executive which designates the image areas to be decoded and the image manipulation operation to be performed.

Other aspects and advantages of the present invention will become apparent from the following detailed description, taken in conjunction with the accompanying drawings, illustrating by way of example the principles of the invention. The claims alone, not the preceding summary or the following detailed description, define the invention.

DESCRIPTION OF THE PREFERRED EMBODIMENT

Figure 1:
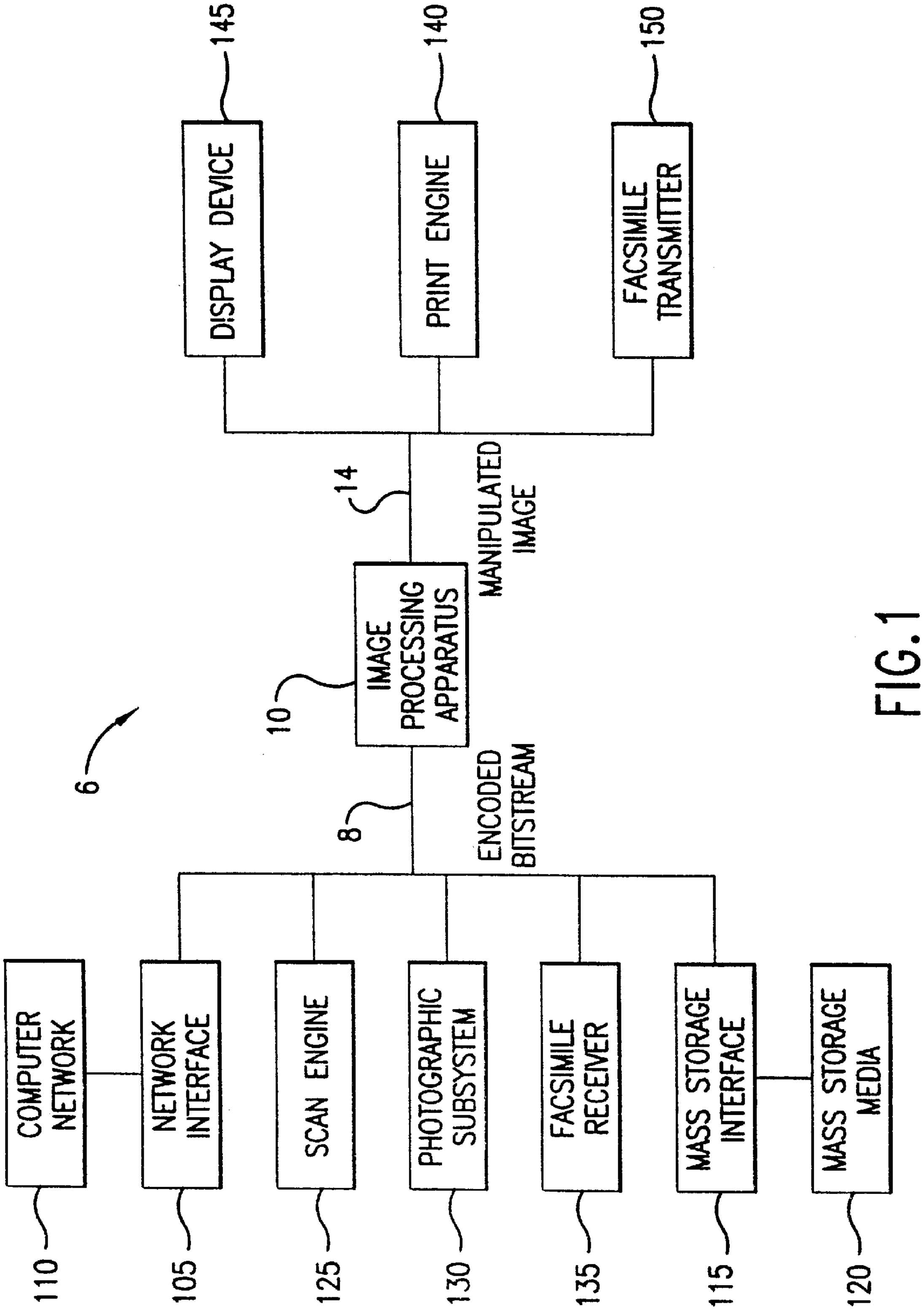
FIG. 1 is a block diagram of an image processing system embodying the present invention.

Referring now to the drawings, FIG. 1 illustrates an image processing system 6 that is constructed in accordance with the present invention. The system 6 processes encoded bitstream data 8 representing a digitized image from a bitstream data source to facilitate image manipulations, the results of which may be viewed, printed, or transmitted using an image output arrangement. The system 6 contains an image processing apparatus 10 coupled between the bitstream source and the viewing arrangement for accepting the encoded bitstream data 8, manipulating the image in a fast and efficient manner in accordance with a novel method of the present invention, and outputting the manipulated image data 14.

The encoded bitstream data 8 is supplied to the prescanner 210 of apparatus 10 by a selected one of a variety of sources. A network interface 105 can supply a previously acquired image to the apparatus 10 from a computer network 110 over electrical connections including but not limited to LAN, USB, and other serial and parallel links such as RS-232 or Centronics, and wireless interconnections including but not limited to Infrared or RF. A mass storage interface 115 that accepts fixed or removable mass storage media 120 including but not limited to magnetic disks or tape, magneto-optical disks, and electrical memory cards can supply the bitstream data 8 to the apparatus 10. Input-output devices such as a scan engine 125, a photographic subsystem 130, or a facsimile receiver 135 coupled to the apparatus 10 can generate the bitstream 8.

The manipulated image 14 is transmitted to an input-output device coupled to the image processing apparatus 10, including but not limited to a print engine 140, a display device 145, or a facsimile transmitter 150. The print engine 140 facilitates the generation of a hard copy of the manipulated digitized image 14 after image processing. The print engine 140 may be of any printing technology, including laserjet, inkjet, thermal, bubble, piezoelectric, dye-sublimation and the like. The display device 145 is used for displaying the manipulated digitized image 14 after image processing. The display device 145 may be a computer monitor, an LCD display, a flat-panel display, or the like.

The image processing system 6 may be implemented as a computer system or as a peripheral device incorporating a subset of the system elements shown in FIG. 1. Contemplated peripheral devices embodying the present invention include a printer incorporating any of the previously stated printing technologies; an all-in-one unit providing some combination of printing, scanning, faxing, and copying capabilities; and a digital camera. Input devices such as a keypad or a pointing device may be incorporated in a peripheral device to specify the digitized image to be manipulated and the manipulation operation to be performed. Peripheral devices such as the digital camera may include an integral electronic display for displaying the image.

Figure 2:
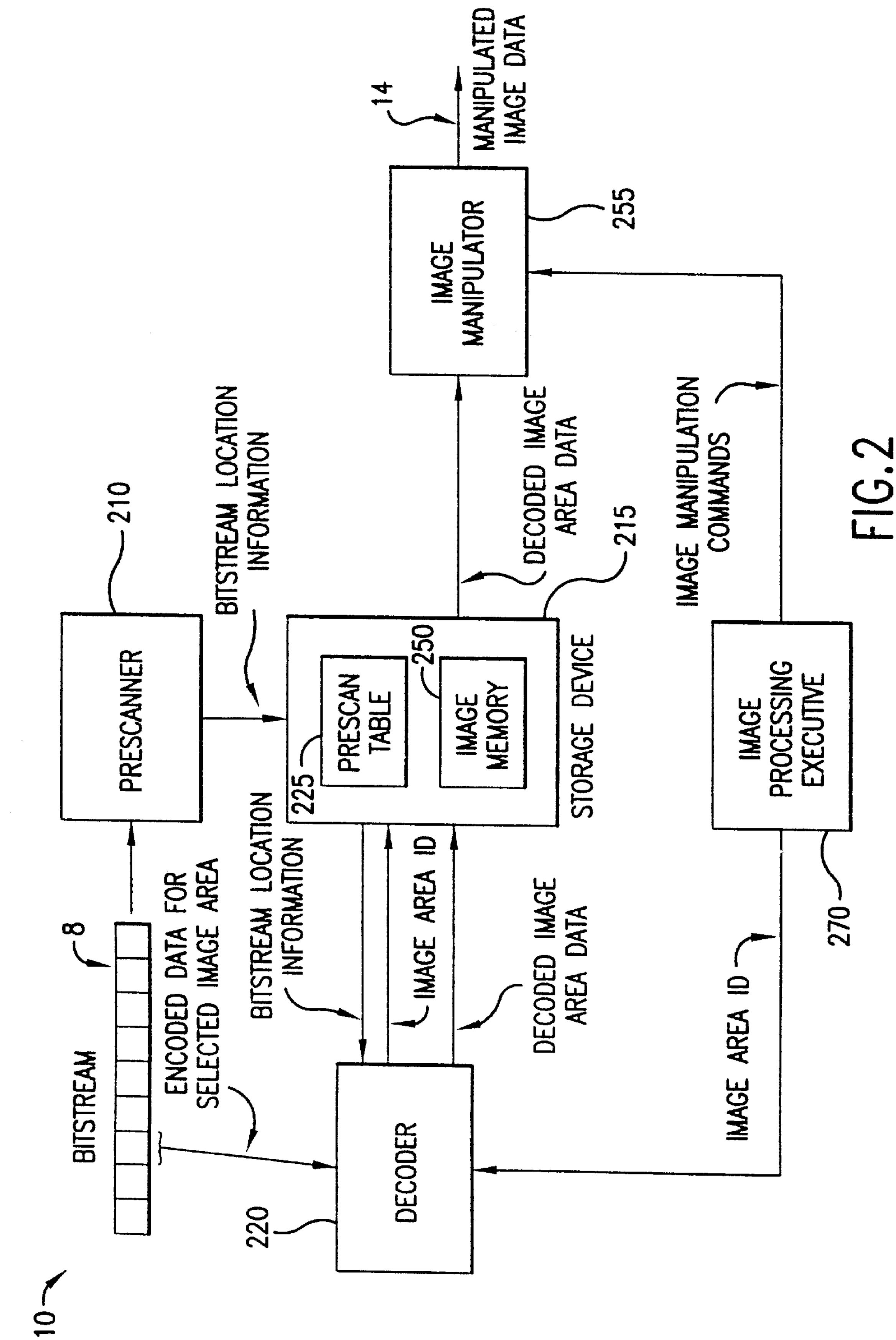
FIG. 2 is a block diagram of a novel image processing apparatus utilized in the image processing system of FIG. 1.

Referring now to the image processing apparatus 10 in greater detail as shown in FIG. 2, the image processing apparatus 10 generally includes a prescanner 210 which pre-processes the bitstream 8 to identify information that will facilitate the image processing operations. A storage device 215, coupled to the prescanner 210, temporarily stores the information identified during the prescan operation in a prescan table 225. A decoder 220 retrieves the information stored in the prescan table 225 to efficiently locate and decode individual encoded areas of the image in the bitstream 8 that will be processed by the image processing operation.

Before discussing the operation of the image processing apparatus 10 in greater detail, it may be beneficial to briefly review the format of the data bitstream 8 in order to understand the benefits of the present invention. In this regard, in order to facilitate rapid transmission of image information and minimize storage space required to contain it, the data bitstream 8 is transmitted in a compressed encoded data format. There are various types of data encoding schemes employed in modern day communication and information systems, such as the image processing system 6. Many encoding schemes use a variable length encoding technique as one way to compress the size of the data. Such encoding schemes include Huffman encoding, adaptive Huffman encoding, Shannon-Fano encoding, arithmetic encoding, run-length encoding, varieties of Lempel-Ziv encoding, and others. These encoding schemes or methods as well as the associated decoding schemes for each are well known to those skilled in the art and are described in various well known publications. As the encoding and decoding schemes are well known, none will be described hereinafter in greater detail. It will suffice for the present discussion to state that the type of encoding is frequently defined by the image format in which the image is stored, and thus, there is no intention of limiting the scope of the present invention to a particular encoding and decoding scheme; the present invention is applicable in general to any one of the above-mentioned types of encoding and decoding schemes.

Considering now the image data bitstream 8 in greater detail, the data contained within it represents one or more encoded image areas which, taken together, represent the entire digitized image to be processed. Each encoded image area consists of a number of encoded code words. Because the bitstream 8 is compressed using variable length encoding, the code words, and thus the image areas, are not of uniform size, and therefore the location in the bitstream 8 of any particular encoded image area cannot be calculated based merely on the order of the image areas in the bitstream 8. In this regard, prior known systems use conventional processes to sequentially decode the entire bitstream 8 and store each image area in decoded, and thus uncompressed, form. While this scheme allows determining the location of each image area, it does so at the cost of a large amount of storage and excessive processing time, both of which are expensive.

Considering now the operation of the prescanner 210 in greater detail, the prescanner 210 pre-processes bitstream information by sequentially decoding the bitstream 8 from its beginning in order to identify and locate each individual encoded image area. In this regard, the prescanner 210 extracts bitstream location information for designated ones of the encoded image areas, causing the location information to be stored in the prescan table 225. Location information typically includes an offset into the bitstream 8 that indicates the starting location in the bitstream 8 of the encoded image area. The prescanner 210 does not store entire decoded image areas.

The designated encoded image areas for which bitstream location information is stored may include all image areas in the bitstream 8, but more typically represents only a subset of them. This is preferable because storing location information for fewer than all image areas reduces the amount of storage required for the prescan table 225, while image areas for which location information is not stored can still be efficient accessed according to the present invention. Therefore, the size of the prescan table 225 can be balanced against the efficiency of access to encoded image areas. The prescan operation concludes when the entire bitstream 8 has been pre-processed.

Considering now the prescanner 210 in further detail, the prescanner 210 can be implemented in either hardware such as by an application-specific integrated circuit, or in firmware to be executed by a microprocessor or microcontroller. Accordingly, the following firmware description is merely an implementation example and is not intended to limit the scope of the present invention.

Figure 3:
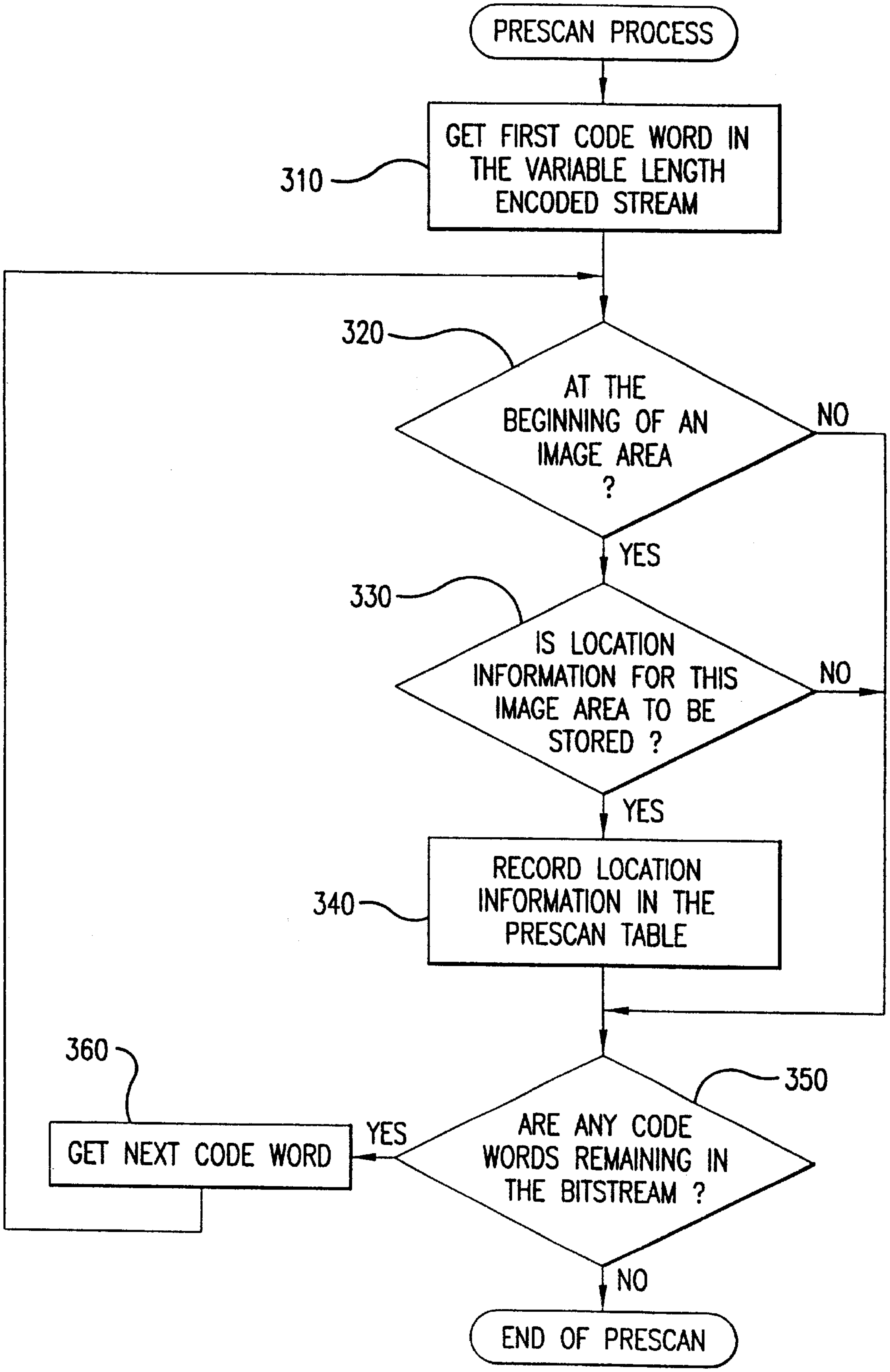
FIG. 3 is a flowchart of a generic algorithm for a prescan operation according to the present invention.

Referring now to FIG. 3, a software implementation of the prescanner 210 is illustrated. The prescan method begins at step 310 by getting the first code word from the bitstream 8. If the code word is the first one belonging to an image area (step 320), and if the image area is one that is designated for recording (step 330), then location information is stored in the prescan table 225 at step 340. If the code word is either not the first one in an image area, or the image area is not designated for recording, then nothing is stored in the prescan table 225 at this time. If there are any code words remaining in the bitstream 8 (step 350), the next code word is obtained at step 360 and method iterates to step 320 with this next code word.

Figure 4:
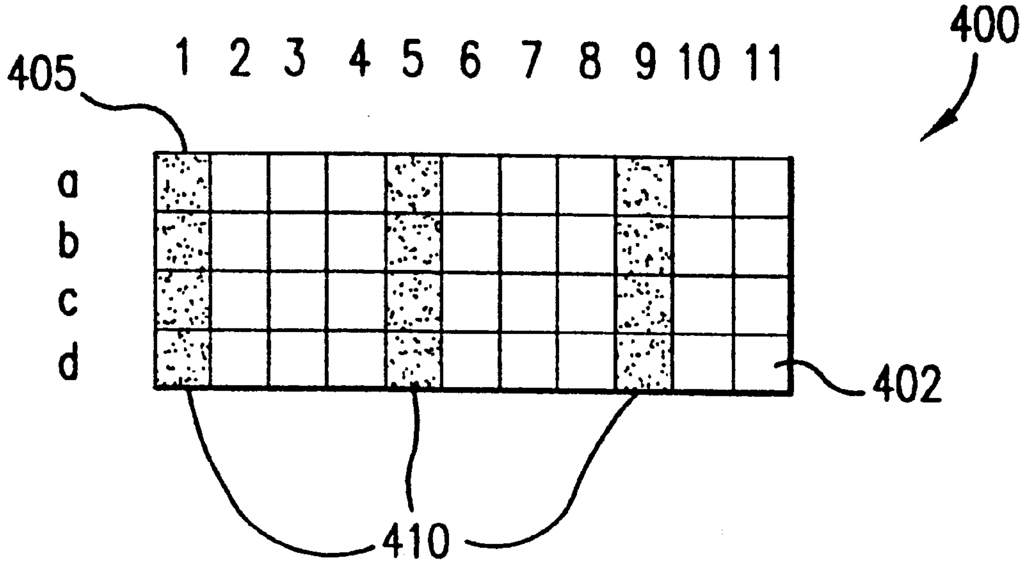
FIG. 4 is a representation of a digitized image indicating by way of example the image areas stored in the prescan table by the operation of the prescan algorithm of FIG. 3 or FIG. 6.

How an implementation of the present invention reduces the required size of the storage device 215 by storing location information only for designated image areas is illustrated in FIG. 4 by way of example. A digitized image 400 is composed of a plurality of individual image areas. Each individual image area, such as an area 402, represents a set of pixels within the digitized image. In uncompressed format, the image areas are of uniform size. The image areas are logically organized in a row-and-column format to make up the entire image. Each image area is stored in the bitstream 8 in compressed format in a left-to-right order for each row beginning at the top left most area, designated "a1" 405. The columns of shaded areas (columns 1, 5, and 9) 410 represent those image areas for which location information is stored in the prescan table 225. Efficient access requires that location information be stored for all image areas in a column; in other words, the column position of the image areas for which location information is stored must be identical for all rows. In addition, all image areas in the left-most column (column 1) must be included among those stored.

Considering now an example selective location information storage algorithm to facilitate location of desired image information, the prescanner 210 achieves this pattern of location information storage by storing the location of each first image area in a row (which is column 1), and then skipping a number of image areas without storing. If the first image area in the next row is detected during skipping, its location information is stored; otherwise, location information for the skipped-to image area is stored. After each location information is stored, skipping begins again. The number of image areas skipped can either be a predetermined number, or can be chosen from an ordered sequence that begins over again whenever the first image area in the next row is detected.

Figure 5:
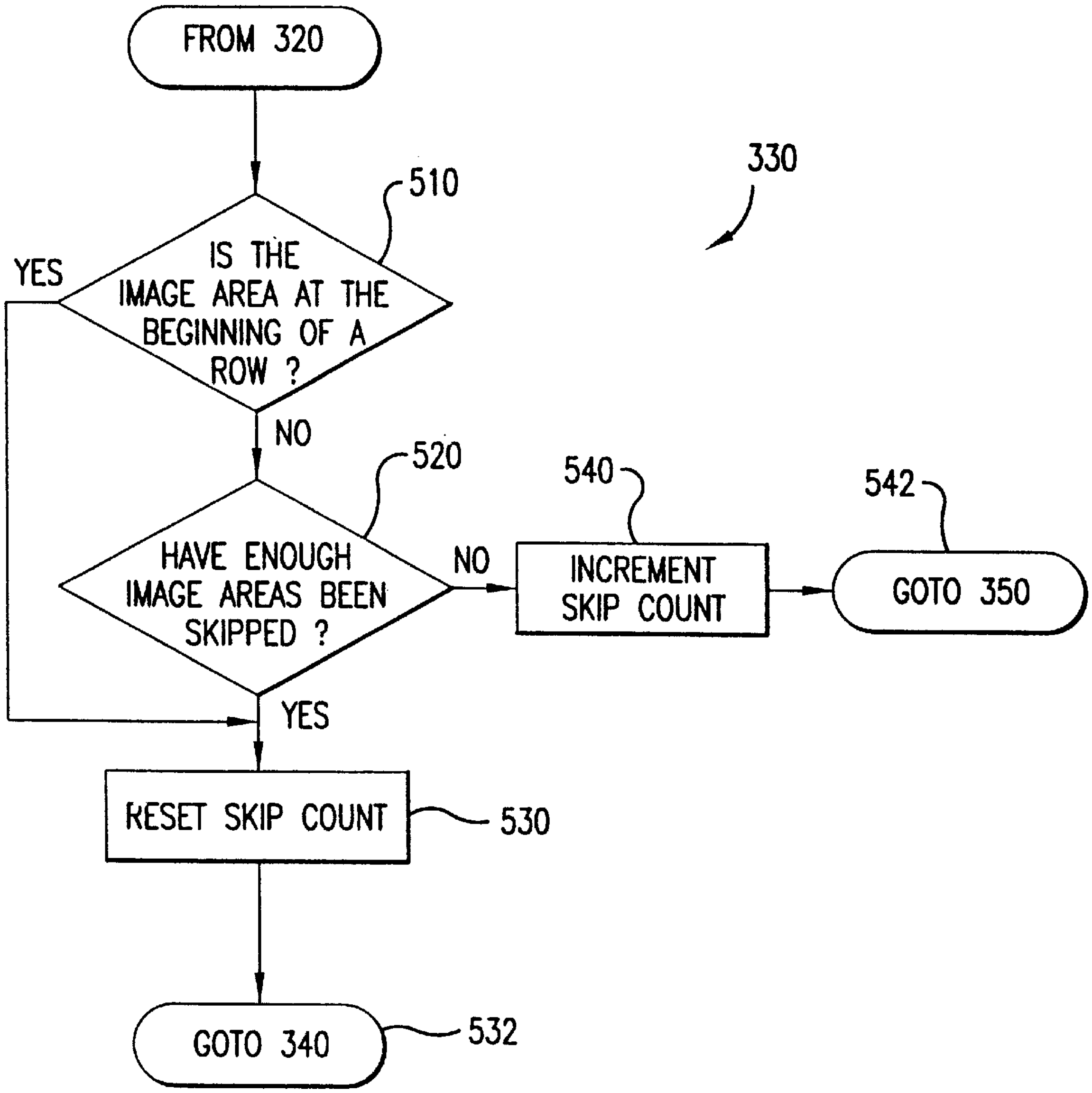
FIG. 5 is a more detailed flowchart describing how the test for whether location information is to be stored for a particular image area in FIG. 3 is performed.

A software implementation of the selective location information storage algorithm just described is shown in FIG. 5. Steps 510 through 540 describe the details of how step 330, which generically indicates the decision whether or not to store location information, is performed. If the image area is at the beginning of a row (step 510), or if enough areas have been skipped (step 520), the skip count will be reset (step 530) and the location information will be stored in the prescan table 225 via the goto step 532. In all other cases, the skip count will be incremented 540 and the location information will not be stored, via the goto step 542.

The contents of the location information stored for an image area may depend on the compressed image format used to store the digitized image. One common format uses the JPEG compression standard, which is well known to those skilled in the art; an explanation of it may be found in "The JPEG Still Picture Compression Standard" by Gregory K. Wallace, published in Communications of the ACM, April 1991. In JPEG terminology, an encoded image area is called a minimal coded unit (or MCU), and it typically represents an eight-by-eight block of pixels. In addition to the compressed pixels, each minimal coded unit also contains a coefficient value for each color channel that is relative to the coefficient value of the corresponding color channel of the previous minimal coded unit. The purpose of using relative coefficients is to reduce the size of the bitstream 8. Because minimal coded units in the bitstream 8 may be accessed in a non-sequential order, the prescanner 210 calculates an absolute coefficient value for each color channel of the minimal coded unit and stores it in the prescan table 225. This removes any dependency on previous minimal coded units in the bitstream 8. The calculated absolute coefficient value is the sum of the relative coefficient values for all previous minimal coded units in the bitstream 8.

After the prescan table 225 has been built and stored, it is used by the decoder 220 to locate and decode specific encoded image areas without the need to sequentially process the bitstream 8 again. To understand the benefits provided by the prescan table 225, consider how image processing is performed.

Creating a manipulated image typically consists of many sequential image manipulation operations. By way of illustration and not limitation, assume that a digitized photograph is to be rotated and cropped using a image processing software package operating on a personal computer. Once the image to be processed has been selected, it is prescanned according to the present method to locate the encoded image areas. Then, at a minimum, it must be manipulated twice: once to rotate it, and again to crop it. Frequently these operations may be performed iteratively, for example until the operator is satisfied that he has chosen the best cropping. Alternatively, the image may first be cropped so that it contains only a smaller portion of the original image, before further manipulation such as rotation of the image is performed on this small portion. In order to rotate, crop, or zoom an image, the image areas are processed in a different order from that in which they exist in the bitstream 8, so efficient random access of specified encoded image areas is required if the image processing is to be done efficiently. When image manipulation is performed according to the present invention, the sequential prescan of the entire digitized image is performed only once. From then on, each image manipulation operation uses the location information stored in the prescan table 225 to efficiently locate selected image areas in the bitstream 8, decode them, and perform the requested image manipulation operation on the affected image areas.

To locate and decode a selected encoded image area, the decoder 220 retrieves the bitstream location information for the corresponding encoded image area from the prescan table 225. If the selected image area is one for which location information has been stored, the decoder 220 uses the bitstream location information to determine the position in the bitstream 8 where the encoded image area data begins, obtains the encoded image area data from the bitstream 8, decodes it into decoded image area data, and then stores the decoded image area data in an image memory 250. Once stored, the decoded image area data can be manipulated by subsequent operations, either alone or in combination with the data from other decoded image areas.

If the encoded image area to be located is not one for which location information has been stored in the prescan table 225, an additional step is required. In this case, the image processing apparatus 10 first determines, from the sequence in which rows and columns of image areas are stored in the bitstream 8, the closest encoded image area stored in the prescan table 225 that precedes the image area to be located in the bitstream 8. The closest image area is located directly, and then the bitstream 8 is scanned sequentially from that point until the desired image area is located and decoded.

By way of illustration, to access image area c8 of FIG. 4, for which location information is not stored in the prescan table 225, the apparatus 10 identifies image area c5 as the closest preceding one for which location information is stored. The decoder 220 directly locates image area c5 in the bitstream, and sequentially scans image areas c6 and c7 to locate image area c8.

Considering now the apparatus 10 in still greater detail, the image processing apparatus 10 further contains an image manipulator 255 coupled to the storage device 215. The image manipulator 255 manipulates the decoded image area or areas stored in the image memory 250 to produce manipulated image data 14 as its output. The device 255 is responsive to an image processing command provided by an image processing executive 270. Possible image manipulation operations include but are not limited to rotating a rectangular portion of the digitized image by a multiple of 90 degrees, cropping the image to the dimensions of the rectangular portion of the digitized image, or zooming the rectangular portion of the digitized image to different dimensions. The algorithms by which digitized images are decoded and then rotated, cropped, or zoomed are known to those skilled in the art, and will not be discussed further herein.

The image processing executive 270 determines the type of image manipulation commands to be performed, and identifies the encoded image areas that comprise the portion of the digitized image to be manipulated. The executive 270 communicates to the decoder 220 the identifiers for the image areas that are to be located and decoded, and once these areas have been decoded by the decoder 220 and stored in the image memory 250, the executive 270 sends the image manipulation commands to the image manipulation device 255 in order to effect the desired image manipulation.

While the bitstream 8 is encoded in image areas which typically encompass a block of pixels, the boundaries of the area of the digitized image to be processed may not coincide with encoded image area boundaries. In this case, the image processing apparatus 10 identifies a first rectangular set of encoded image areas which encompasses all pixels contained within the boundaries. Furthermore, in many cases the first column of each row in the first set of encoded image areas may represent areas for which information is not stored in the prescan table 225. If this is the case, a second rectangular set of encoded image areas encompassing the first set is identified such that the first column of each row in the second set is an encoded image area for which location has been stored. As a result, a slightly larger area of the digitized image than the one specified by the original boundaries will be processed.

Consider now another prescan algorithm 600 (FIG. 6) for implementing the prescanner 210. As known to those skilled in the art, in prior art implementations the minimal coded unit bitstream of a JPEG image is scanned sequentially by a variable length decoder which locates and performs an initial decode of each encoded image area. Each image area is then further decoded by first dequantizing it and then performing an inverse discrete cosine transform (IDCT), which results in the decompressed digitized image. According to the present invention, once the prescan operation has been performed, sequential scanning is not required for any encoded image area for which location information is stored in the prescan table 225 by the prescanner 210, because the image area can be accessed directly. The variable length decoding, dequantizing, and inverse discrete cosine transform functions required for JPEG decompression are performed by the decoder 220.

Figure 6:
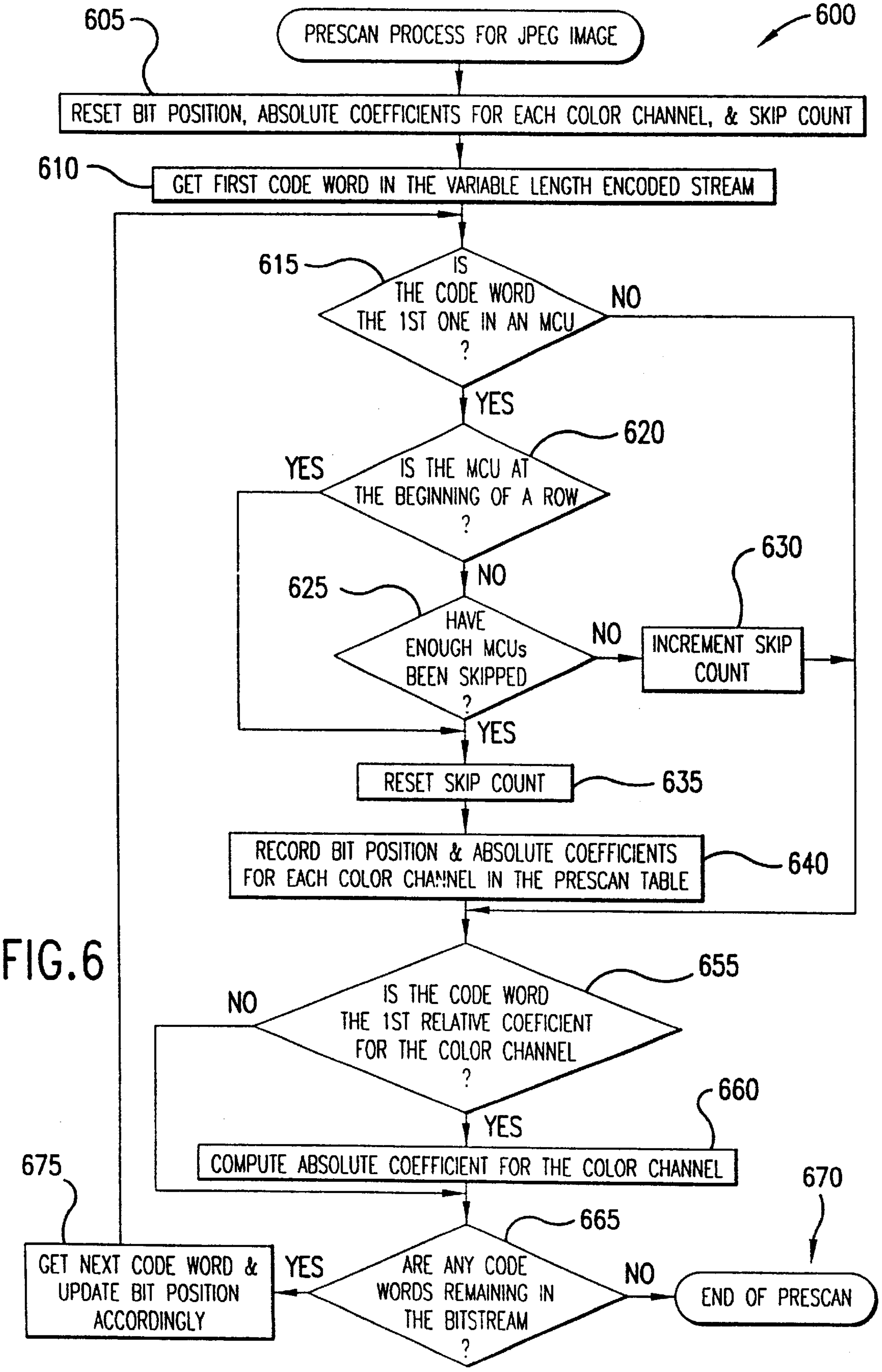
FIG. 6 is a flowchart of a specific prescan algorithm of the general type of FIG. 3 used with images stored in a JPEG-format bitstream

The prescan algorithm 600 for a JPEG bitstream is best understood with reference to FIG. 6. After resetting temporary variables representing absolute coefficients for all color channels, the current bit position in the encoded bitstream 8, and the skip count (step 605), the bitstream is sequentially processed bit-by-bit, starting with the first code word (step 610). Each code word in a JPEG bitstream uses between 2 and 16 bits. If the current code word is not the first one in a minimal coded unit ("no" branch of step 615), the prescan algorithm skips to step 655, the effect of which will be described subsequently.

If the current code word is the first code word in a minimal coded unit ("yes" branch of step 615), then if either the current code word is located at the beginning of a minimal code unit which represents an image area at the beginning of a row of the image ("yes" branch of step 620), or if enough minimal coded units have been skipped ("yes" branch of step 625), then the skip count is reset (step 635) and the current bit position is recorded in the prescan table 225 along with the current absolute coefficient values for each color channel (step 640). If the current code word is not located at the beginning of a minimal code unit which is at the beginning of a row of the image ("no" branch of step 620), and if enough minimal coded units have not been skipped ("no" branch of step 625), then the skip count is incremented (step 630).

At step 655, if the current code word is the first relative coefficient for the current color channel ("yes" branch of step 655), then the new value of the absolute coefficient for that color channel is calculated (step 660); if it is not the first relative coefficient ("no" branch of step 655), step 660 is skipped. The updated absolute coefficient is computed in step 660 by adding the relative coefficient to the current value of the absolute coefficient.

Next, the prescan algorithm will determine whether any as-yet unread code words remain in the bitstream 8 (step 665). If there are no remaining code words, the prescan algorithm 600 is concluded (step 670). Otherwise, the next code word is obtained from the bitstream and the bit position variable is updated accordingly (step 675). Then the algorithm loops back to step 615 to process the code word obtained in step 675.

Figure 7:
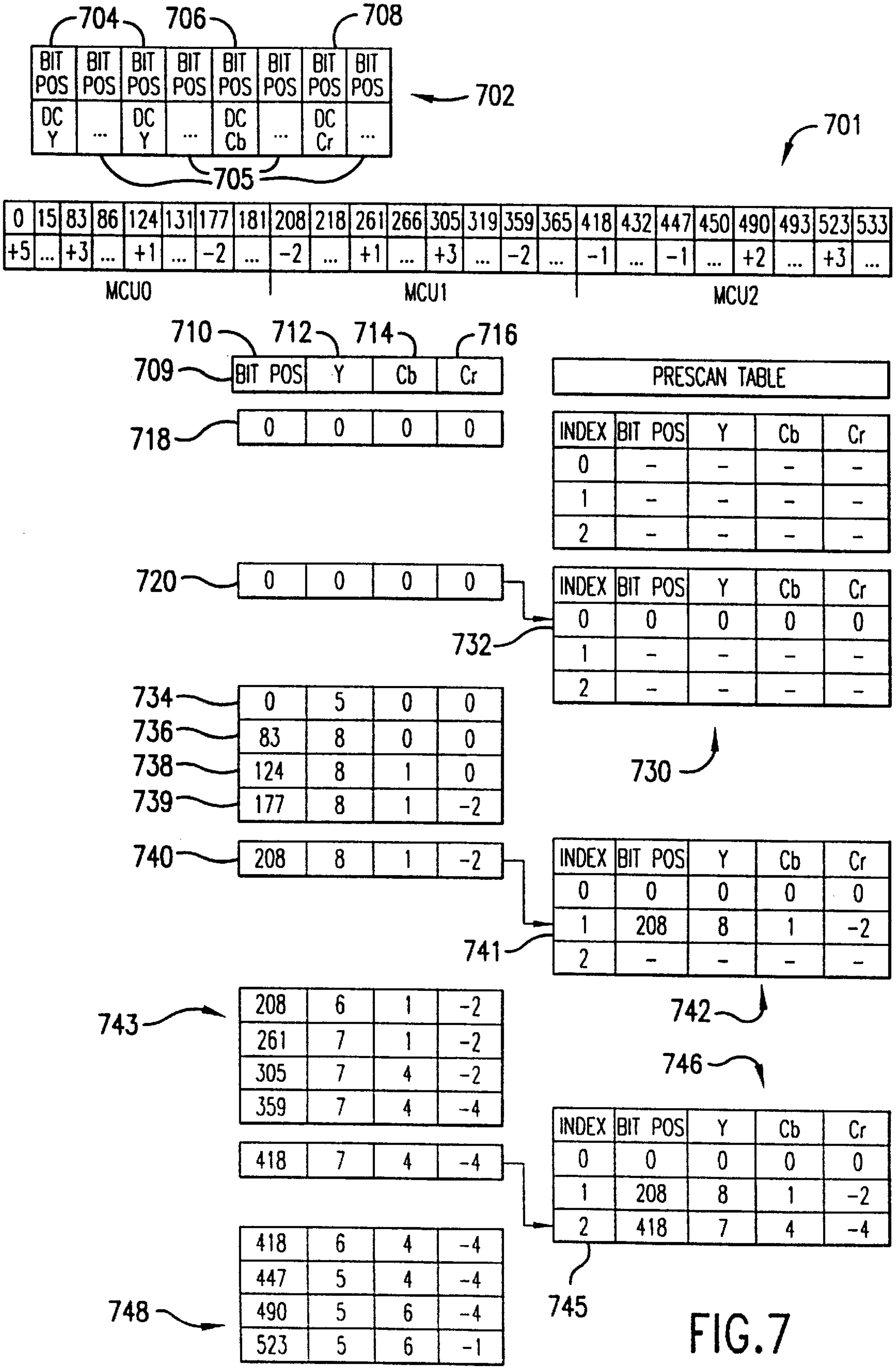
FIG. 7 illustrates by way of example the effect of executing the algorithm of FIG. 6 to construct a pre-scan table for a JPEG-format bitstream.

FIG. 7 illustrates by way of example how the algorithm 600 builds the pre-scan table 225. A simplified set of contents for a minimal coded unit in the format described at 702 includes two first relative coefficients DC Y 704 representing the Y color channel, one first relative coefficient DC Cb 706 representing the Cb color channel, and one first relative coefficient DC Cr 708 representing the Cr color channel. Following each of these four first coefficients is a set of additional code words 705 representing subsequent relative coefficients for that color channel. Since only the first relative coefficient of each color channel is of interest to the prescan algorithm, these subsequent coefficients will not be discussed any further herein and their values are not shown.

A set of temporary variables 709 record the bit position 710 of the current code word, the current value of the absolute Y coefficient 712 for the Y color channel, the current value of the absolute Cb coefficient 714 for the Cb color channel, and the current value of the absolute Cr coefficient 716 for the Cr color channel. Whenever a code word representing a relative coefficient is detected, the value of the corresponding absolute coefficient variable is updated by step 660 by adding the relative coefficient to the current value of the absolute coefficient. The example bitstream to be processed 701 consists of three minimal coded units, denoted MCU0 starting at bit position #0, MCU1 starting at bit position #208, and MCU2 starting at bit position #418, each minimal coded unit having relative DC coefficient values as shown. Each time the prescan operation detects the start of a new minimal coded unit for which information is to be stored, the current value of the set of temporary absolute coefficient variables 709 is written into the next available position in the prescan table 225 by step 640 of the prescan algorithm. For purposes of this simplified example, assume that every minimal coded unit in the example bitstream 701 is to be stored in the prescan table 225; in other words, the "yes" branch will always be taken when step 625 is performed.

Considering now the effect of prescanning the example bitstream 701, at the start of the prescan operation, all local variables 709 are reset to zero, as indicated at 718. The example bitstream 701 is then processed starting at bit position 0. Because the code word at bit position #0 is the first one in MCU0, the current values of the local variables 720 (BitPos=0, Y=0, Cb=0, Cr=0) are stored into the Index 0 position 732 of the prescan table via step 640. At this time, the contents of the prescan table are as shown at 730. In addition, because this code word is the first one in a set of coefficients for the Y color channel, the value of the absolute Y variable is set to 0+5=5, as shown at 734.

Next, as the prescanner reads the code words contained in bit positions #15 through #82, only the bit position variable 710 is updated (not shown); step 660 is not executed because none of these code words are the first one in a set of coefficients for a color channel. Then the prescan operation reads the code word at bit position #83; since it represents the first code word in the second set of Y coefficients for MCU0, the value of the local Y variable is set to 5+3=8, as shown at 736. In a similar manner, when the prescanner 210 reads to bit position #124 and then decodes the DC Cb coefficient which has a value of +1, the local Cb variable is set to 0+1=1, as shown at 738. Then the prescan operation reads to bit position #177 and decodes the DC Cr coefficient which has a value of −2, thus the local Cr variable is set to 0+(−2)=−2, as shown at 739.

When the prescanner reads to bit position #208 and detects the first code word of MCU1, step 640 stores the current value of the set of local variables (BitPos=208, Y=8, Cb=1, Cr=−2) 740 into the prescan table at the Index 1 position 741. At this time, the contents of the prescan table are as shown at 742.

The process of scanning, updating absolute coefficients, and storing the local variables in the prescan table is similarly repeated for the remaining minimal coded units. The results 743 of scanning MCU1 generate absolute coefficient values of Y=7, Cb=4, Cr=−4 which are stored in the prescan table at the Index 2 position 745 when the start of MCU2 is detected at bit position #418. At this time, the contents of the prescan table are as shown at 746. While the subsequent scanning of MCU2 results in the local variable values shown at 748, nothing further gets stored in the prescan table because MCU2 is the last minimal coded unit in the example bitstream 701 and thus no starting boundary of a subsequent minimal coded unit is detected.

After prescanning is completed, the completed prescan table 746 contains 3 entries, each one indicating the starting bit position of a minimal coded unit as well as the values of the absolute coefficients for the color channels at that position in the bitstream.

From the foregoing it will be appreciated that the invention provides a novel and advantageous method and apparatus for manipulating a digitized image stored in a variable length encoded bitstream data format. The entire image need not be stored in buffer memory in an uncompressed format in order to manipulate the image, which significantly reduces the amount of buffer memory required in a computer system or a peripheral device incorporating the invention. And because non-sequential access to encoded image areas in a bitstream is performed more efficiently, it allows lower-performance and lower-cost processing devices to perform image manipulation.

Although several specific embodiments of the invention have been described and illustrated, the invention is not to be limited to the specific methods, forms, or arrangements of parts so described and illustrated. The invention is limited only by the claims.

What is claimed is:

1. A method for processing a variable length encoded binary bitstream collectively indicative of a digitized image, comprising:

sequentially detecting individual ones of a plurality of encoded image areas in the bitstream, each detected one of the plurality of encoded image areas indicative of a region of pixels within the digitized image;

storing location information for designated detected ones of the plurality of encoded image areas, the designated detected ones including fewer than all the detected ones;

decoding at least some of the detected ones of the plurality of encoded image areas; and wherein each individual ones of the plurality of encoded image areas is indicative of a first rectangular two-dimensional space of uniform size, wherein the plurality of encoded image areas is indicative of a second rectangular two-dimensional space organized in rows and columns of encoded image areas, and wherein the designated detected ones of the plurality of encoded image areas are selected such that the column positions are identical for all rows.

2. The method of claim 1, wherein the step of decoding includes:

storing the decoded ones of the encoded image areas to facilitate the manipulation of the digitized image.

3. The method of claim 1, wherein the step of storing further includes storing a calculated absolute coefficient value for the designated detected ones of the plurality of encoded image areas.

4. The method of claim 3, wherein each individual one of the plurality of encoded image areas is a minimal coded unit according to a JPEG format.

5. The method of claim 3, wherein each individual one of the plurality of encoded image areas has a relative coefficient value.

6. The method of claim 1, wherein the location information includes an offset into the bitstream of the start of the encoded image area.

7. The method of claim 4, wherein the digitized image has a plurality of color channels, and each minimal coded unit has a corresponding plurality of relative coefficient values.

8. The method of claim 7, where the step of storing location information includes storing a calculated absolute coefficient value for each color channel of the minimal coded unit.

9. The method of claim 5, wherein the calculated absolute coefficient value is the sum of the relative coefficient values for the sequentially detected individual ones of the plurality of encoded image areas.

10. The method of claim 8, wherein the calculated absolute coefficient value for each color channel is the sum of the relative coefficient values for the color channel.

11. The method of claim 1 wherein the at least some of the detected ones decoded include detected ones for which no location information is stored.

12. The method of claim 1 wherein the decoding further includes using the stored location information to decode at least some detected ones for which no location information is stored.

13. An image processing apparatus, comprising:

prescan means for sequentially detecting individual ones of a plurality of encoded image areas embodied in a variable length encoded bitstream, each detected one of the plurality of encoded image areas indicative of a region of pixels within the digitized image;

decoding means for decoding at least some of the detected ones of the plurality of encoded image areas for image manipulation purposes; and storage means for storing location information provided by the prescan means for fewer than all the detected ones of the plurality of encoded image areas, and for storing a decoded image area provided by the decoding means for each decoded one of the plurality of encoded image areas, to facilitate manipulation of the digitized image.

14. The apparatus of claim 13, where the prescan means further comprises an application-specific integrated circuit.

15. The apparatus of claim 13, where the prescan means further comprises a microprocessor.

16. The apparatus of claim 13, further comprising image manipulation means coupled to the storage means for manipulating the decoded image areas to form a processed image.

17. The apparatus of claim 16, further comprising an image processing executive coupled to the decoding means for designating the individual ones of the plurality of encoded image areas to be decoded.

18. The apparatus of claim 17, where the image processing executive is further coupled to the image manipulation means for designating an image manipulation operation.

19. The apparatus of claim 13, further comprising a bitstream source coupled to the prescan means and the decoding means for supplying the bitstream.

20. The apparatus of claim 19, where the bitstream source is a scan engine.

21. The apparatus of claim 19, where the bitstream source is a photographic engine.

22. The apparatus of claim 19, where the bitstream source is a facsimile receiver.

23. The apparatus of claim 19, where the bitstream source is a memory interface adapted to receive a mass storage device containing the bitstream.

24. The apparatus of claim 23, where the mass storage device is a memory card.

25. The apparatus of claim 19, where the bitstream source is a network interface adapted to receive the bitstream from a network device.

26. The apparatus of claim 25, where the network device is a computer.

27. The apparatus of claim 16, further comprising a print engine coupled to the image manipulation means for facilitating the printing of the processed image.

28. The apparatus of claim 27, where the print engine is a inkjet printer print engine.

29. The apparatus of claim 28, where the inkjet printer print engine is a thermal inkjet printer print engine.

30. The apparatus of claim 28, where the inkjet printer print engine is a bubble inkjet printer print engine.

31. The apparatus of claim 28, where the inkjet printer print engine is a piezoelectric inkjet printer print engine.

32. The apparatus of claim 16, further comprising a display device coupled to the image manipulation means for facilitating the display of the processed image.

33. The apparatus of claim 32, where the display device is a liquid crystal display.

34. The apparatus of claim 32, where the display device is a cathode ray tube display.

* * * * *